(12) United States Patent
Issler

(10) Patent No.: US 6,857,733 B2
(45) Date of Patent: Feb. 22, 2005

(54) INK JET PRINTING WITH UNIFORM GLOSS

(75) Inventor: Sandra Laurine Issler, Newark, DE (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 31 days.

(21) Appl. No.: 10/300,335

(22) Filed: Nov. 20, 2002

(65) Prior Publication Data

US 2003/0193553 A1 Oct. 16, 2003

Related U.S. Application Data

(60) Provisional application No. 60/331,938, filed on Nov. 21, 2001.

(51) Int. Cl.⁷ .................................................. B41J 2/01
(52) U.S. Cl. ........................ 347/100; 347/101; 347/95; 347/98; 523/160
(58) Field of Search ................................ 347/100, 101, 347/96, 95; 106/31.13, 31.6, 31.27; 523/160

(56) References Cited

U.S. PATENT DOCUMENTS

| | | |
|---|---|---|
| 5,085,698 A | 2/1992 | Ma et al. |
| 5,231,131 A | 7/1993 | Chu et al. |
| 5,302,197 A | 4/1994 | Wickramanayke et al. |
| 5,519,085 A | 5/1996 | Ma et al. |
| 5,733,363 A | 3/1998 | Nagashima et al. |
| 5,738,716 A | 4/1998 | Santilli et al. |
| 5,972,089 A | 10/1999 | Martin |
| 6,193,361 B1 | 2/2001 | Wen |
| 6,204,307 B1 * | 3/2001 | Miyabayashi ............. 106/31.6 |
| 6,209,998 B1 | 4/2001 | Yue |
| 6,234,601 B1 * | 5/2001 | Hayashi et al. ............ 347/100 |
| 6,328,408 B1 | 12/2001 | Gelbart |
| 6,474,778 B1 | 11/2002 | Koitabashi et al. |
| 6,537,364 B2 * | 3/2003 | Dietz et al. ................ 106/493 |
| 2001/0020964 A1 * | 9/2001 | Irihara et al. ................ 347/43 |
| 2003/0085974 A1 | 5/2003 | Shimomura et al. |
| 2004/0032473 A1 | 2/2004 | Ishimoto et al. |

FOREIGN PATENT DOCUMENTS

| | | | |
|---|---|---|---|
| EP | 0 905 207 A2 | 3/1999 | |
| EP | 1 138 729 A1 | 4/2001 | |
| EP | 1 145 865 A2 | 10/2001 | |
| EP | 1 302 324 A1 | 4/2003 | |
| JP | 08-085218 * | 4/1996 | ............. B41J/2/01 |
| JP | 1996085218 A | 4/1996 | |
| WO | WO 02/087886 A1 | 7/2002 | |

OTHER PUBLICATIONS

International Search Report (PCT/US02/37303) dated Apr. 2, 2003.

* cited by examiner

*Primary Examiner*—Stephen D. Meier
*Assistant Examiner*—Manish Shah
(74) *Attorney, Agent, or Firm*—Bart E. Lerman

(57) ABSTRACT

This invention pertains to a method of ink jet printing, in particular to a method of ink jet printing with an ink set including a gloss equalizing colorless ink.

18 Claims, No Drawings

INK JET PRINTING WITH UNIFORM GLOSS

CROSS-REFERENCE TO RELATED APPLICATION

This application claims priority under 35 U.S.C. §119 from U.S. Provisional Application Ser. No. 60/331,938 (filed Nov. 21, 2001), which is incorporated by reference herein as if fully set forth.

BACKGROUND OF THE INVENTION

This invention pertains to a method of ink jet printing, in particular to a method of ink jet printing with an ink set comprising a gloss equalizing colorless ink.

For photographic and other high definition imaging, uniform, high gloss is desirable to enhance the perception of clarity and sharpness of image. Ink jet printers can be used to print digital images with photographic quality if a suitable recording medium, such as glossy ink jet paper, is used. This paper is coated with an ink jet ink receptive layer to carry the image and absorb vehicle (reduce dry time).

Two types of ink jet receptive coating structures are commonly used for ink jet photo glossy media: swellable-polymer, non-porous media ("polymer" media) and a microporous, porous media ("microporous" media). A third type, often referred to as hybrid ink jet media, makes use of a combination of these coating technologies. The coatings are applied to a substrate such as a cellulose-based sheet or PET film.

The polymer-coated media typically comprises a hydrophilic polymer that absorbs the aqueous vehicle, dries the ink, and binds the colorant to the media. Typical polymers for this application are polyvinyl alcohol (PVA) and polyvinylpyrrolidones (PVP). The advantages of polymer coating are high gloss (typically 60 to 90 gloss units, GU, measured at 60°) and a relatively large capacity for aqueous vehicle absorption. The disadvantages are slow dry times and poor durability, in particular poor waterfastness.

The microporous media are typically comprised of water-absorbing fine particles or powders mixed with a polymeric hydrophilic binder to form a microporous structured coating. The hydrophilic particles or powders are typically polycrystalline inorganic materials such as boehmite alumina or amorphous inorganic materials such as aluminum silicates. In some cases, hydrophilic polymeric spheres, such as polyacrylic acid or latices, are the hydrophilic particles. The advantages of microporous media are quick drying and improved durability, in particular waterfastness and smudge resistance. The disadvantages are low gloss (typically less than 60 GU at 60°).

As ink jet printing speeds increase, microporous photo glossy papers are preferred due to their quick drying capabilities and improved durability.

It is difficult to achieve uniform gloss with most ink/media combinations because the ink tends to cause a change in gloss relative to the unprinted media. The effect increases with increasing color density (i.e. tonal value) and is particularly evident when printing with pigmented inks. There is need for a simple means to achieve uniform gloss between the medium (no ink) and the printed areas (all color densities, all colors) with any ink set.

U.S. Pat. No. 5,972,089 teaches use of phosphated esters in colored inks to increase gloss a high coverage.

U.S. Pat. No. 6,209,998 teaches application of heat to an image printed with pigment ink so as to smooth out the surface of the print and thereby increase gloss.

EP-A-1145865 provides a coating liquid for forming a transparent top coat on a image imparting light resistance, water resistance, fixation and glossiness.

JP-A-08085218 appears to describe the use of combinations of colored and colorless inks to print on transparent base material. The colorless ink should have at most a 0.1 difference in refractive index from the colored inks.

WO02/087886 appears to describe ink jet printing with combinations of colored and colorless inks to obtain a practically uniform glossiness.

All of the above publications are incorporated by reference herein for all purposes as if fully set forth.

SUMMARY OF THE INVENTION

Most ink/media systems exhibit non-uniform gloss across regions of different color density (tonal value). The degree and direction of the non-uniformity differ depending on the particular ink and especially on the particular medium type. It was found that colorless inks comprising formulating ingredients without colorant can effect gloss in similar ways as the colored inks. This finding is used to advantage in achieving an objective of the instant invention, which is to provide prints with uniform gloss across all tonal values.

Accordingly, there is provided a method for ink jet printing with improved gloss uniformity, comprising the step of jet printing an image onto a recording medium with an ink set comprising colored inks and at least one colorless ink, wherein the at least one colorless ink is printed substantially only in locations on the image where there is no colored ink (so as to substantially equalize gloss across the full tonal range of the image).

In this way, the gloss differences which occur between areas of high and low (no) colored ink density are compensated for by application of a colorless ink to low (no) density areas, resulting in a more equalized (uniform) gloss across the entire image. There is substantially no overlap of colored and colorless ink, the drops of colorless ink are printed between the drops of colored ink. By "substantially equalize gloss" it is meant that the gloss differences across different tonal values is decreased. Preferably the gloss is equalized to the point of uniformity, that is, to a point where an observer cannot detect any significant difference to the naked eye.

In another aspect of the present invention, there is provided an improved method for ink jet printing of an image with improved gloss uniformity, the method comprising the step of jet printing the image onto a recording medium with an ink set comprising colored inks, wherein the improvement comprises using an ink set comprising colored inks and at least one colorless ink, wherein the at least one colorless ink is printed substantially only in locations on the image where there is no colored ink (so as to substantially equalize gloss across the full tonal range of the image).

In another aspect there is provided a method for ink jet printing on low gloss media to provide a high gloss image with substantially uniform gloss across the full tonal range, comprising the step of jet printing an image onto a recording medium with an ink set comprising colored inks and at least one colorless ink, wherein:

a) the inks of the ink set add gloss such that the gloss of the printed area is higher than that of the unprinted media; and b) the at least one colorless ink is printed substantially only in locations on the image where there is no colored ink (so as to substantially equalize gloss across the full tonal range of the image).

These and other features and advantages of the present invention will be more readily understood by those of ordinary skill in the art from a reading of the following detailed description. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination.

DETAILED DESCRIPTION OF THE PREFERRED EMBODIMENTS

This invention provides at least one gloss equalizing colorless ink to an ink set and, during ink jet printing, the at least one colorless ink is applied to regions of low (no) color density to add ink fill without changing color. The droplets of colorless ink are applied between the droplets of colored ink. As a result, ink fill (color+clear) is more equal across all color densities and, because the colorless ink is preferably matched to the colored ink in its effect on gloss, equalized ink fill causes the gloss to become more uniform across the entire image. It is not necessary to completely fill the entire image to achieve uniform gloss. As can be seen in the examples, changes in gloss generally level off above about 60–70% fill. From teachings provided herein, one will appreciate that the composition of the clear ink and the amount of fill can be adjusted to provide any level of gloss uniformity desired. As an additional benefit, when gloss is equalized according to the instant invention, the distinctness-of-image (DOI) is also found to improve.

To realize the full benefits of this invention and achieve substantially uniform gloss across all tonal values, the gloss of the colored inks are preferably matched to each to each other so that gloss is also uniform in areas of high colored ink density. The colorless ink compensates for gloss differences only between low (no) and high colored ink density. Within regions of high density, where no colorless ink is deposited, gloss uniformity from one color to another must be inherent in the colored inks themselves. The gloss of colored inks can be effected by choice of colorant, formulation and media.

The colored inks of the ink set can be any useful ink jet inks. Preferably they are aqueous based. The colorant can be a soluble dye, or a particulate colorant such as a dispersed dye or pigment. The ink may also contain other additives known in the art.

The aqueous colored inks are based on an aqueous vehicle that is typically water or a mixture of water and at least one water-soluble organic solvent (co-solvent). Selection of a suitable mixture depends on requirements of the specific application, such as desired surface tension and viscosity, the selected colorant, drying time of the ink, and the type of substrate onto which the ink will be printed. Representative examples of water-soluble organic solvents that may be selected are disclosed in U.S. Pat. No. 5,085,698 (incorporated by reference herein for all purposes as if fully set forth).

When the colorant is particulate, it is desirable to use small particles for maximum color strength and good jetting. The particle size is typically in the range of about 0.01 to about 0.3 micron. Representative commercial dry and presscake pigments for pigment inks are disclosed in previously incorporated U.S. Pat. No. 5,085,698.

Aqueous inks with insoluble colorants typically contain a dispersant for the insoluble colorants, to the extent the insoluble colorants are not made self-dispersing in accordance with a variety of well-known techniques.

Dispersants are most often either structured or random polymers, although structured polymers are preferred for use as dispersants for reasons well known in the art. The term "structured polymer" means polymers having a block, branched or graft structure. Particularly preferred structured polymers are AB or BAB block copolymers disclosed in previously incorporated U.S. Pat. No. 5,085,698; ABC block copolymers disclosed in U.S. Pat. No. 5,519,085; and graft polymers disclosed in U.S. Pat. No. 5,231,131. The disclosures of the latter two references are also incorporated by reference herein for all purposes as if fully set forth.

The ink jet ink may contain other ingredients as are well known in the art. For example, anionic, nonionic, or amphoteric surfactants may be used. In aqueous inks, the surfactants are typically present in the amount of about 0.01–5% and preferably about 0.2–2%, based on the total weight of the ink.

Biocides may be used to inhibit growth of microorganisms.

Sequestering agents such as EDTA may also be included to eliminate deleterious effects of heavy metal impurities. Other known additives may also be added to improve various properties of the ink compositions as desired.

Numerous types of ink jet inks and components thereof are in general well known to those of ordinary skill in the art, and reference may be had to numerous disclosures for further details, such as those incorporated by reference above, as well as U.S. Pat. No. 5,302,197, EP-A-1138729, EP-A-0905207, U.S. Pat. No. 5,733,363 and Stephen F. Pond, *Ink Jet Technology and Product Development Strategies*, Torrey Pines Research (2000) (all also incorporated by reference herein for all purposes as if fully set forth).

The composition of colorless ink is not restricted in any way, although it is contemplated that in most cases it will comprise the vehicle, without colorant, of the associated colored inks in the ink set. The colorless ink can contain any of the usual ink jet ink components such as water, co-solvent, polymers, surfactants, biocides and thickeners. Since the colorless ink compositions are not restricted, these ink compositions can have a range of physical properties of these colorless inks. Refractive index differences between the colored inks and the colorless ink greater than 0.1 can be used.

The presence of polymer in the ink often has a pronounced effect on gloss. It is advantageous for the colorless ink to comprise polymer particularly in situations where the colored inks of the ink set comprise polymer. Polymers are commonly added to inks as, for example, dispersants such as those mentioned above, binders and thickeners. Any polymer present in a colorless ink is preferably one or more of the polymers used in the colored inks of the set, but need not be, and can be any polymer which jets smoothly and provides a suitable degree of gloss.

Polymers include soluble polymers, dispersion polymers and emulsion polymers, especially those which are soluble, dispersible or emulsified in water for use with aqueous ink jet inks when printed on hydrophilic media. Polymer types include, but are not limited to, poly(meth)acrylates, styrene maleic anhydrides, polyurethanes, polyesters, polycarbonates, polyolefins such as polyvinyl acetates and polyvinyl alcohols, and mixtures thereof. The polymers can be random or structured (e.g. block, graft or star co-polymers).

The colorless ink of this invention need not contact the colored ink in order to be effective. Preferably, there is substantially no overlap of the colored ink and the colorless ink on the printed image, although in practice some incidental overlap might occur. Likewise, there is no need for pre-treatment or in-line or post-processing such as fixing, hardening or heating as in U.S. Pat. No. 6,209,998 (incorporated by reference herein for all purposes as if fully set forth), although pre- or post-treatment might be useful for other purposes such a faster drying. No other reactions need to take place. Furthermore, the instant invention is advantageous over methods that apply colorless ink as a topcoat over the entire image, such as in previously incorporated EP1145865, because there is less ink for the media to handle. The reduced amount of ink volume will allow increased printing speed by reducing print dry-time, and will avoid over-saturation of the media with can lead to undesirable properties such as paper cockle.

In application, the colorless ink can be printed with the same type of print head as the ones used for the colored ink, or it can be different. The print head with the colorless ink can be nested on the same carriage as the colored inks or, if desired, located separately. Typically, but not necessarily, the ink jet print heads used for the applications contemplated herein are of the thermal and piezo type.

The same printing method concepts can be applied to solvent-based ink/media systems when non-uniform gloss is an issue. Numerous solvent-based inks and components thereof are also well known to those of ordinary skill in the art, who are capable of formulating suitable solvent-based inks based on the desired printer, printing conditions, media, end use and other factors known to those skilled persons.

In a preferred embodiment, the printing media is paper (cellulose) based (optionally coated) such as, for example, glossy ink jet paper, microporous media and hybrid ink jet media.

Also in a preferred embodiment, the instant invention is applied to low gloss media such that the printed image is not only uniform in gloss but also higher in gloss than the unprinted media. Thus with microporous media, for example, the benefits of that media can be realized without sacrificing high gloss.

COMPARATIVE EXAMPLES

Gloss measurements of various ink/media combinations are provided to demonstrate the lack of uniformity generally present in representative commercial systems. A test pattern of 2.5 cm squares of each ink over a tonal scale of 0% (media) to 100% area fill was printed. The gloss of each area fill was measured with a Byk-Gardner micro-Tri-glossmeter at an angle of 60 degrees, unless otherwise noted, and the values reported in gloss units (GU). In each series of results, the average (avg.) gloss across the range of area fills is provided, along with the standard deviation (std. dev.). The standard deviation is viewed as a measure of gloss uniformity. Within any set of gloss uniformity data, lower standard deviation suggests that the gloss uniformity is better.

As used herein:

HP=Hewlett Packard
HP970=HP DeskJet 970 Cxi printer
DJ2500=HP DesignJet 2500CP printer
2000P=Epson Stylus Photo 2000P printer
BJC8200=Canon BJC8200 bubble jet color printer
HPUV=HP pigment inks for HP2500CP printer
2000P ink=Epson pigment inks for 2000P printer
HP C6598A=HP dye inks (and cartridge) for DJ970 printer
BJC8200 ink=Canon dye inks for BJC8200 printer
HP C6795A=HP microporous media
HP C6831A and HP C3836A=HP polymer media
S041141 and S041286=Epson microporous media
F51-3261-400=Canon microporous media On microporous media, which tends to be low to medium gloss, application of pigment ink causes gloss to increase as ink density is increased. High fill areas can be fifty or more gloss units higher than low (no) fill areas (Comparative examples A–H). The effect is general over a range of different ink/media combinations.

On high gloss polymer coated media, application of pigment ink (Comparative example I) and dye ink (Comparative example J) caused gloss to decrease as ink density increased. The high fill areas can be twenty gloss units or more lower than the low (no) fill areas.

In some cases, dye inks printed on microporous media do not add gloss to the media (for instance, Comparative example K). The gloss values of ink area fills are equivalent to the media gloss (no fill areas) over the entire ink density range. These ink/media systems provide uniform gloss, however, the gloss is relative low (i.e. less than 60 GU) and high gloss cannot be achieved.

Comparative Example A

Gloss Uniformity of Pigment Ink (HPUV) on Microporous Media (HP C6795A). Printed with DJ2500, High Quality Mode.

|  | 60 Degree Gloss | | | |
| --- | --- | --- | --- | --- |
| Area Fill | Cyan | Magenta | Yellow | Black |
| 100% | 83 | 103 | 88 | 88 |
| 75% | 82 | 92 | 74 | 73 |
| 69% | 81 | 88 | 70 | 70 |
| 45% | 77 | 76 | 60 | 60 |
| 33% | 66 | 66 | 50 | 52 |
| 18% | 53 | 54 | 41 | 42 |
| 11% | 38 | 40 | 33 | 33 |
| 8% | 35 | 36 | 30 | 30 |
| 3% | 26 | 27 | 25 | 25 |
| Media | 22 | 22 | 22 | 22 |
| Avg. | 56 | 60 | 49 | 49 |
| Std. Dev. | 24 | 29 | 23 | 23 |

Comparative Example B

Gloss Uniformity of Pigment Ink (HPUV) on Microporous Media (S041141). Printed with DJ2500, High Quality Mode.

|  | 60 Degree Gloss | | | |
| --- | --- | --- | --- | --- |
| Area Fill | Cyan | Magenta | Yellow | Black |
| 100% | 63 | 58 | 57 | 44 |
| 71% | 61 | 64 | 57 | 54 |
| 69% | 60 | 64 | 56 | 54 |
| 45% | 55 | 60 | 52 | 53 |
| 33% | 55 | 56 | 49 | 50 |
| 18% | 48 | 51 | 46 | 48 |
| 11% | 44 | 45 | 44 | 44 |
| 8% | 43 | 44 | 42 | 43 |
| 3% | 40 | 40 | 40 | 40 |
| media | 38 | 39 | 39 | 39 |

-continued

| | 60 Degree Gloss | | | |
|---|---|---|---|---|
| Area Fill | Cyan | Magenta | Yellow | Black |
| Avg. | 50 | 52 | 48 | 47 |
| Std. Dev. | 9 | 10 | 7 | 6 |

Comparative Example C
Gloss Uniformity of Pigment Ink (HPUV) on Microporous Media (S041286). Printed with DJ2500, High Quality Mode.

| | 60 degree gloss | | | |
|---|---|---|---|---|
| Area Fill | Cyan | Magenta | Yellow | Black |
| 100% | 84 | 105 | 100 | 89 |
| 71% | 81 | 92 | 83 | 69 |
| 69% | 80 | 89 | 80 | 67 |
| 45% | 71 | 78 | 69 | 58 |
| 33% | 63 | 68 | 61 | 52 |
| 18% | 53 | 57 | 52 | 46 |
| 11% | 45 | 48 | 45 | 41 |
| 8% | 43 | 45 | 43 | 39 |
| 3% | 38 | 39 | 38 | 37 |
| media | 35 | 35 | 35 | 35 |
| Avg. | 59 | 65 | 61 | 53 |
| Std. Dev. | 19 | 24 | 22 | 17 |

Comparative Example D
Gloss Uniformity of Pigment Ink (HPUV) on Microporous Media (F51-3261-400). Printed with DJ2500, High Quality Mode.

| | 60 Degree Gloss | | | |
|---|---|---|---|---|
| Area Fill | Cyan | Magenta | Yellow | Black |
| 100% | 88 | 104 | 94 | 89 |
| 71% | 88 | 89 | 81 | 73 |
| 69% | 87 | 86 | 78 | 70 |
| 45% | 84 | 78 | 71 | 64 |
| 33% | 78 | 72 | 66 | 61 |
| 18% | 70 | 65 | 60 | 58 |
| 11% | 63 | 60 | 57 | 55 |
| 8% | 60 | 58 | 56 | 54 |
| 3% | 56 | 55 | 54 | 53 |
| media | 53 | 53 | 53 | 52 |
| Avg. | 73 | 72 | 67 | 63 |
| Std. Dev. | 14 | 17 | 14 | 11 |

Comparative Example E
Gloss Uniformity of Pigment Ink (2000P Inks) on Microporous Media (HP6795A). Printed with 2000P, High Quality Mode.

| | 60 Degree Gloss | | |
|---|---|---|---|
| Area Fill | Cyan | Magenta | Yellow |
| 100% | 76 | 63 | 59 |
| 80% | 68 | 54 | 44 |
| 60% | 61 | 49 | 38 |
| 40% | 51 | 43 | 35 |
| 20% | 33 | 32 | 27 |
| media | 22 | 22 | 21 |
| Avg. | 52 | 44 | 37 |
| Std. Dev. | 21 | 15 | 13 |

Comparative Example F
Gloss Uniformity of Pigment Ink (2000P Inks) on Microporous Media (S041141). Printed with 2000P, High Quality Mode.

| | 60 Degree Gloss | | |
|---|---|---|---|
| Area fill | Cyan | Magenta | Yellow |
| 100% | 68 | 62 | 62 |
| 80% | 67 | 61 | 57 |
| 60% | 65 | 59 | 54 |
| 40% | 61 | 56 | 51 |
| 20% | 52 | 50 | 47 |
| media | 42 | 42 | 42 |
| Avg. | 59 | 55 | 52 |
| Std. Dev. | 10 | 8 | 7 |

Comparative Example G
Gloss Uniformity of Pigment Ink (2000P Inks) on Microporous Media (S041286). Printed with 2000P, High Quality Mode.

| | 60 Degree Gloss | | |
|---|---|---|---|
| Area Fill | Cyan | Magenta | Yellow |
| 100% | 82 | 68 | 66 |
| 80% | 76 | 62 | 57 |
| 60% | 71 | 61 | 52 |
| 40% | 63 | 56 | 49 |
| 20% | 48 | 46 | 42 |
| media | 35 | 35 | 35 |
| Avg. | 63 | 55 | 50 |
| Std. Dev. | 18 | 12 | 11 |

Comparative Example H
Gloss Uniformity of Pigment Ink (2000P Inks) on Microporous Media (F51-3261-400). Printed with 2000P, High Quality Mode.

| | 60 Degree Gloss | | |
|---|---|---|---|
| Area Fill | Cyan | Magenta | Yellow |
| 100% | 86 | 99 | 84 |
| 80% | 85 | 82 | 74 |
| 67% | 83 | 73 | 68 |
| 50% | 79 | 62 | 60 |
| 33% | 70 | 57 | 58 |
| 20% | 63 | 55 | 56 |

-continued

|  | 60 Degree Gloss | | |
| --- | --- | --- | --- |
| Area Fill | Cyan | Magenta | Yellow |
| 10% | 57 | 54 | 54 |
| media | 52 | 52 | 52 |
| Avg. | 72 | 67 | 63 |
| Std. Dev. | 13 | 17 | 11 |

Comparative Example I

Gloss Uniformity of Pigment Ink (HPUV) on Polymer Media (HP C6831A). Printed with DJ2500, High Quality Mode.

|  | 60 Degree Gloss | | | |
| --- | --- | --- | --- | --- |
| Area Fill | Cyan | Magenta | Yellow | Black |
| 100% | 77 | 77 | 67 | 86 |
| 80% | 76 | 71 | 61 | 79 |
| 67% | 77 | 75 | 66 | 76 |
| 50% | 81 | 77 | 73 | 72 |
| 33% | 86 | 83 | 80 | 76 |
| 20% | 88 | 86 | 84 | 78 |
| 10% | 89 | 89 | 88 | 80 |
| media | 90 | 90 | 90 | 90 |
| Avg. | 83 | 81 | 76 | 80 |
| Std. Dev. | 6 | 7 | 11 | 6 |

Comparative Example J

Gloss Uniformity of Dye Ink (HP C6875A) on Microporous Media (HP C6831A). Printed with DJ970, High Quality Mode.

|  | 60 Degree Gloss | | |
| --- | --- | --- | --- |
| Area Fill | Cyan | Magenta | Yellow |
| 100% | 65 | 82 | 84 |
| 80% | 67 | 64 | 67 |
| 67% | 70 | 65 | 68 |
| 50% | 75 | 68 | 71 |
| 33% | 79 | 75 | 78 |
| 20% | 83 | 80 | 84 |
| 10% | 86 | 85 | 87 |
| media | 90 | 90 | 90 |
| Avg. | 77 | 76 | 78 |
| Std. Dev. | 9 | 10 | 9 |

Comparative Example K

Gloss Uniformity of Dye Ink (BJC8200 Ink) on Polymer Media (F51-3261-400). Printed with BJC8200, High Quality Mode.

|  | 60 Degree Gloss | | | |
| --- | --- | --- | --- | --- |
| Area Fill | Cyan | Magenta | Yellow | Black |
| 100% | 51 | 51 | 54 | 51 |
| 80% | 51 | 51 | 54 | 52 |
| 67% | 52 | 51 | 54 | 53 |
| 50% | 52 | 52 | 53 | 54 |

-continued

|  | 60 Degree Gloss | | | |
| --- | --- | --- | --- | --- |
| Area Fill | Cyan | Magenta | Yellow | Black |
| 33% | 52 | 52 | 53 | 53 |
| 20% | 51 | 51 | 51 | 52 |
| 10% | 50 | 51 | 51 | 50 |
| media | 49 | 49 | 49 | 49 |
| Avg. | 51 | 51 | 52 | 52 |
| Std. Dev. | 1 | 1 | 2 | 1 |

EXAMPLES

Colorless Inks referred to as "vehicle"-only comprised by percent weight of the total weight of ink, 5% tetraethylene glycol, 5% Liponics EG-1 (ethoxylated glycol, Lipo Chemical), 5% 2-pyrrolidone, 1% Tergitol 15s7 (ethoxylated secondary alcohol, Dow Chemical) and the balance water.

Colorless ink referred to as "water"-only comprised by weight of the total weight of ink 95% H2O and 5% Liponics EG-1 humectant. The humectant was needed for proper jetting performance.

Polymer-containing Colorless Inks A–K comprised 5% Li-ponics EG-1, 5% tetraethylene glycol, 5% 2-pyrrolidone, 1% Tergitol 15s7, 2% polymer selected from the acrylic copolymers in the table below, and the balance water. The letter designation of the ink corresponds to the polymer used. The viscosity in all cases was 2-3 cps at 23° C. (Brookfield viscometer).

| Acrylic Co-Polymer | Composition |
| --- | --- |
| Polymer A | BzMA/ETEGMA/MAA |
| (Random Polymer) | 60/30/10 |
| Polymer B | BMA/ETEGMA/MAA |
| (Random Polymer) | 60/30/10 |
| Polymer C | MMA/ETEGMA/MAA |
| (Random Polymer) | 60/30/10 |
| Polymer D | BzMA/MMA/ETEGMA/MAA |
| (Random Polymer) | 30/30/30/10 |
| Polymer E | BzMA/Sty/ETEGMA/MAA |
| (Random Polymer) | 30/30/30/10 |
| Polymer F | BzMA/ETEGMA/MAA |
| (Random Polymer) | 55/30/15 |
| Polymer G | BzMA/HEMA/MAA |
| (Random Polymer) | 60/30/10 |
| Polymer H | ETEGMA/BzMA//ETEGMA/MAA |
| (Block Polymer) | 5/13//5/10 |
| Polymer I | POEA/HEA//ETEGMA/MAA |
| (Graft Polymer) | 45/20//-G-20/15 |
| Polymer J | BzMA/ZMA/ETEGMA/AA |
| (Random Polymer) | 57/3/30/10 |

Methods for making the above acrylic polymers, and acrylic polymers suitable in general for dispersants, are well known. See for example: George Odian, *Principles of Polymerization*, John Wiley and Sons, (1991); and Owen Webster, *Molecular Architecture Control in Acrylic Polymers*, 34th International Symposium on Macromolecules, (1992).

For demonstration, the "vehicle" and "water" colorless inks were printed with a DJ970 (high quality mode) on S041141 microporous media and HP C6831A polymer media. On microporous media, there was little gloss response of either colorless ink at any level of fill. On polymer media, there was a substantial negative response on gloss for both colorless inks going from no fill to high fill. Particularly surprising is the observed effect even for water-only. Results are as follows:

| Area Fill | Microporous Media (60 degree Gloss) | | Polymer Media (20 degree Gloss) | |
|---|---|---|---|---|
| | 'Vehicle' | 'Water' | 'Vehicle' | 'Water' |
| 100% | 40 | 38 | 55 | 47 |
| 71% | 41 | 40 | 50 | 56 |
| 69% | 41 | 40 | 50 | 55 |
| 45% | 41 | 40 | 47 | 55 |
| 33% | 39 | 40 | 48 | 56 |
| 18% | 40 | 41 | 56 | 58 |
| 11% | 41 | 41 | 60 | 60 |
| 8% | 41 | 41 | 63 | 63 |
| 3% | 39 | 41 | 66 | 63 |
| Media | 40 | 40 | 67 | 66 |
| Avg. | 40 | 40 | 56 | 58 |
| Std. Dev. | 1 | 1 | 8 | 5 |

It is believed, without being bound to any particular theory, that the liquid (vehicle and/or water) solubilizes the polymer coating of the polymer media and changes the surface texture such that, upon drying, the altered surface exhibits less gloss. In the case of microporous media, again without being bound to any particular theory, it is believed the vehicle and/or water are rapidly absorbed into the microporous coating without altering the surface and thus the gloss remains unchanged.

Polymer-containing colorless inks A–J were printed with a DJ970 printer on S041141 microporous media. Results are as follows:

| Area Fill | 60 Degree Gloss for Colorless Inks A–J | | | | | | | | | |
|---|---|---|---|---|---|---|---|---|---|---|
| | A | B | C | D | E | F | G | H | I | J |
| 100% | 61 | 61 | 65 | 64 | 68 | 70 | 63 | 65 | 57 | 73 |
| 71% | 71 | 67 | 62 | 65 | 68 | 68 | 68 | 63 | 58 | 67 |
| 69% | 69 | 66 | 61 | 64 | 68 | 67 | 66 | 63 | 58 | 67 |
| 45% | 64 | 62 | 57 | 59 | 62 | 61 | 61 | 58 | 56 | 61 |
| 33% | 59 | 58 | 54 | 56 | 57 | 57 | 56 | 54 | 53 | 57 |
| 18% | 54 | 53 | 50 | 52 | 53 | 52 | 52 | 50 | 49 | 51 |
| 11% | 49 | 48 | 46 | 47 | 49 | 48 | 48 | 47 | 46 | 48 |
| 8% | 48 | 47 | 46 | 47 | 47 | 47 | 47 | 45 | 45 | 46 |
| 3% | 44 | 44 | 43 | 44 | 44 | 43 | 43 | 43 | 44 | |
| 0% | 42 | 42 | 41 | 41 | 43 | 42 | 42 | 41 | 41 | 42 |
| Avg. | 56 | 55 | 53 | 54 | 56 | 56 | 54 | 53 | 51 | 55 |
| Std. Dev. | 10 | 9 | 8 | 9 | 10 | 11 | 10 | 9 | 6 | 11 |

The polymer-containing colorless inks show the same trend in gloss increases on microporous media as the pigment inks in the comparative examples and in particular are quite similar to Comparative Examples B and F which use the same paper.

Examples 1–10 illustrate the invention. A test pattern of 2.5 cm squares was printed showing a tonal scale of an individual colored ink and the comparable tonal scale with the inventive colorless ink printed between the droplets of colored ink to equalize gloss. The area fill of colored ink and ratio of colored ink to colorless ink area fill, is indicated for each point. Thus, in the case where the a ratio of cyan/colorless ink is reported to be 40/55, for instance, the cyan ink is 40% of the fill and the colorless ink is 55% of the fill (95% total fill of colored+colorless ink in the 2.5 cm test square). The gloss was measured as described for the comparative examples. To perform the printing test one of the primary inks of the ink set was replaced with the colorless ink to print the tonal scale test pattern.

The printer was an Epson Stylus 980 (high quality mode). The media in each case is noted in the example. The pigments inks were the 2000P inks. The polymer-containing dye ink, adapted from recipes disclosed in previously incorporated EP-A-1122286, was as follows:

| Ingredients: | Cyan Dye Ink (weight %) | Magenta Dye Ink (weight %) |
|---|---|---|
| Cyan DB199 | 20.79% | — |
| RR180 Red Dye (80L3) | — | 32.88 |
| Polymer A | 2% | 2% |
| 1,2 Hexanediol | 5.00% | 5.00% |
| Glycerol | 10.00% | 10.00% |
| Surfynol 465 | 0.80% | 0.80% |
| Triethanolamine | 3.00% | 3.00% |
| Triethylene glycol mono-butyl ether | 7.50% | 7.50% |
| Triethylene glycol | 3.00% | 3.00% |
| Deionized water | balance | balance |
| Total | 100% | 100% |

The colorless ink, also adapted from recipes disclosed in previously incorporated EP-A-1122286, was (on weight percent basis): 2% Polymer A; 3% 1,2-hexanediol; 10% Glycerol; 7.5% Triethylene Glycol monobutyl ether; 3% Triethylene glycol; 1% Surfynol TG (Air Products Co., Allentown, Pa.); and the balance water.

Results on microporous media (Examples 1–6) show the addition of the colorless ink to areas between the colored ink drops (and to media without any colored ink) raises the average gloss of the image and improves the gloss uniformity as measured by smaller standard deviation. Results on polymer media (Examples 7-10) show the gloss uniformity improves as measured by the standard deviation although the average gloss decreases.

Example 1

Improved Gloss Uniformity of Pigment Ink on HP6795A Microporous Media

| 1A. Cyan | | | |
|---|---|---|---|
| % Area Fill Cyan Ink | Gloss (GU) Cyan Ink | % Area Fill Cyan/Colorless | Gloss (GU) Cyan + Colorless |
| 100 | 76 | 100/0 | 76 |
| 80 | 68 | 80/0 | 68 |
| 60 | 67 | 60/0 | 67 |
| 40 | 51 | 40/55 | 63 |
| 20 | 33 | 20/65 | 60 |
| media | 22 | 0/70 | 60 |
| Avg. | 53 | — | 66 |
| Std. Dev. | 22 | — | 6 |

| 1B. Magenta | | | |
|---|---|---|---|
| % Area Fill Magenta Ink | Gloss (GU) Magenta Ink | % Area Fill Magenta/Colorless | Gloss (GU) Magenta + Colorless |
| 100 | 63 | 100/0 | 63 |
| 80 | 54 | 80/20 | 63 |

1B. Magenta -continued

| % Area Fill Magenta Ink | Gloss (GU) Magenta Ink | % Area Fill Magenta/Colorless | Gloss (GU) Magenta + Colorless |
|---|---|---|---|
| 60 | 49 | 60/35 | 58 |
| 40 | 43 | 40/60 | 57 |
| 20 | 32 | 20/65 | 52 |
| media | 22 | 0/75 | 52 |
| Avg. | 44 | — | 57 |
| Std. Dev. | 15 | — | 5 |

1C. Yellow

| % Area Fill Yellow Ink | Gloss (GU) Yellow Ink | % Area Fill Yellow/Colorless | Gloss (GU) Yellow + Colorless |
|---|---|---|---|
| 100 | 59 | 100/0 | 59 |
| 80 | 44 | 80/20 | 62 |
| 60 | 38 | 60/40 | 64 |
| 40 | 35 | 40/60 | 59 |
| 20 | 27 | 20/65 | 58 |
| media | 21 | 0/70 | 57 |
| Avg. | 37 | — | 60 |
| Std. Dev. | 13 | — | 2 |

Example 2

Improved Gloss Uniformity of Pigment Ink on S041141 Microporous Media

2a. Cyan

| % Area Fill Cyan Ink | Gloss (GU) Cyan Ink | % Area Fill Cyan/Colorless | Gloss (GU) Cyan + Colorless |
|---|---|---|---|
| 100 | 68 | 100/0 | 71 |
| 80 | 67 | 80/0 | 68 |
| 60 | 65 | 60/0 | 65 |
| 40 | 61 | 40/0 | 63 |
| 20 | 52 | 20/75 | 69 |
| media | 42 | 0/80 | 66 |
| Avg. | 59 | — | 67 |
| Std. Dev. | 10 | — | 3 |

2b. Magenta

| % Area Fill Magenta Ink | Gloss (GU) Magenta Ink | % Area Fill Magenta/Colorless | Gloss (GU) Magenta + Colorless |
|---|---|---|---|
| 100 | 62 | 100/0 | 65 |
| 80 | 61 | 80/0 | 62 |
| 60 | 59 | 60/0 | 61 |
| 40 | 56 | 40/0 | 58 |
| 20 | 50 | 20/40 | 58 |
| media | 42 | 0/50 | 55 |
| Avg. | 55 | — | 60 |
| Std. Dev. | 8 | — | 4 |

2c. Yellow

| % Area Fill Yellow Ink | Gloss (GU) Yellow Ink | % Area Fill Yellow/Colorless | Gloss (GU) Yellow + Colorless |
|---|---|---|---|
| 100 | 62 | 100/0 | 63 |
| 80 | 57 | 80/0 | 61 |
| 60 | 54 | 60/35 | 62 |
| 40 | 51 | 40/40 | 61 |
| 20 | 47 | 20/50 | 61 |
| media | 42 | 0/50 | 59 |
| Avg. | 52 | — | 61 |
| Std. Dev. | 7 | — | 1 |

Example 3

Improved Gloss Uniformity of Pigment Ink on S041286 Microporous Glossy

3a. Cyan

| % Area Fill Cyan Ink | Gloss (GU) Cyan Ink | % Area Fill Cyan/Colorless | Gloss (GU) Cyan + Colorless |
|---|---|---|---|
| 100 | 82 | 100/0 | 81 |
| 80 | 76 | 80/0 | 76 |
| 60 | 71 | 60/0 | 70 |
| 40 | 63 | 40/50 | 69 |
| 20 | 48 | 20/60 | 63 |
| media | 35 | 0/68 | 60 |
| Avg. | 63 | — | 70 |
| Std. Dev. | 18 | — | 8 |

3b. Magenta

| % Area Fill Magenta Ink | Gloss (GU) Magenta Ink | % Area Fill Magenta/Colorless | Gloss (GU) Magenta + Colorless |
|---|---|---|---|
| 100 | 68 | 100/0 | 69 |
| 80 | 62 | 80/20 | 69 |
| 60 | 61 | 60/40 | 67 |
| 40 | 56 | 40/60 | 62 |
| 20 | 46 | 20/65 | 59 |
| media | 35 | 0/70 | 54 |
| Avg. | 55 | — | 63 |
| Std. Dev. | 12 | — | 6 |

3c. Yellow

| % Area Fill Yellow Ink | Gloss (GU) Yellow Ink | % Area Fill Yellow/Colorless | Gloss (GU) Yellow + Colorless |
|---|---|---|---|
| 100 | 66 | 100/0 | 66 |
| 80 | 57 | 80/20 | 72 |
| 60 | 52 | 60/40 | 69 |
| 40 | 49 | 40/60 | 66 |
| 20 | 42 | 20/60 | 67 |
| media | 35 | 0/60 | 60 |
| Avg. | 50 | — | 67 |
| Std. Dev. | 11 | — | 4 |

Example 4
Improved Gloss Uniformity of Polymer-Containing Dye Ink on HP C6795A Microporous Media

4a. Cyan

| % Area Fill Cyan Ink | Gloss (GU) Cyan Ink | % Area Fill Cyan/Colorless | Gloss (GU) Cyan + Colorless |
| --- | --- | --- | --- |
| 100 | 92 | 100/0 | 93 |
| 80 | 50 | 80/20 | 87 |
| 60 | 35 | 60/40 | 91 |
| 40 | 27 | 40/60 | 93 |
| 20 | 23 | 20/80 | 98 |
| media | 23 | 0/100 | 89 |
| Avg. | 42 | — | 92 |
| Std. Dev. | 27 | — | 4 |

4b. Magenta

| % Area Fill Magenta Ink | Gloss (GU) Magenta Ink | % Area Fill Magenta/Colorless | Gloss (GU) Magenta + Colorless |
| --- | --- | --- | --- |
| 100 | 65 | 100/0 | 69 |
| 80 | 35 | 80/20 | 68 |
| 60 | 27 | 60/40 | 65 |
| 40 | 26 | 40/60 | 68 |
| 20 | 24 | 20/80 | 67 |
| media | 23 | 0/80 | 66 |
| Avg. | 33 | — | 67 |
| Std. Dev. | 16 | — | 1 |

Example 5
Improved Gloss Uniformity of Polymer-Containing Dye Ink on S041286 Microporous Media

5a. Cyan

| % Area Fill Cyan Ink | Gloss (GU) Cyan Ink | % Area Fill Cyan/Colorless | Gloss (GU) Cyan + Colorless |
| --- | --- | --- | --- |
| 100 | 96 | 100/0 | 88 |
| 80 | 66 | 80/10 | 70 |
| 60 | 51 | 60/20 | 66 |
| 40 | 41 | 40/60 | 66 |
| 20 | 37 | 20/70 | 71 |
| media | 36 | 0/100 | 68 |
| Avg. | 54 | — | 71 |
| Std. Dev. | 23 | — | 8 |

5b. Magenta

| % Area Fill Magenta Ink | Gloss (GU) Magenta Ink | % Area Fill Magenta/Colorless | Gloss (GU) Magenta + Colorless |
| --- | --- | --- | --- |
| 100 | 67 | 100/0 | 68 |
| 80 | 43 | 80/20 | 68 |
| 60 | 38 | 60/40 | 66 |
| 40 | 37 | 40/60 | 65 |
| 20 | 36 | 20/75 | 70 |
| media | 35 | 0/80 | 65 |
| Avg. | 43 | — | 67 |
| Std. Dev. | 12 | — | 2 |

Example 6
Improved Gloss Uniformity of Polymer-Containing Dye Ink on S041141 Microporous Media

6a. Cyan

| % Area Fill Cyan Ink | Gloss (GU) Cyan Ink | % Area Fill Cyan/Colorless | Gloss (GU) Cyan + Colorless |
| --- | --- | --- | --- |
| 100 | 65 | 100/0 | 67 |
| 80 | 63 | 80/0 | 65 |
| 60 | 61 | 60/40 | 63 |
| 40 | 58 | 40/60 | 63 |
| 20 | 50 | 20/80 | 59 |
| media | 42 | 0/100 | 60 |
| Avg. | 57 | — | 63 |
| Std. Dev. | 9 | — | 3 |

6b. Magenta

| % Area Fill Magenta Ink | Gloss (GU) Magenta Ink | % Area Fill Magenta/Colorless | Gloss (GU) Magenta + Colorless |
| --- | --- | --- | --- |
| 100 | 59 | 100/0 | 61 |
| 80 | 55 | 80/20 | 56 |
| 60 | 52 | 60/40 | 57 |
| 40 | 50 | 40/60 | 56 |
| 20 | 46 | 20/80 | 56 |
| media | 42 | 0/80 | 56 |
| Avg. | 51 | — | 57 |
| Std. Dev. | 6 | — | 2 |

Example 7
Improved Gloss Uniformity of Pigment Ink on HP C6831 Polymer Media

7a. Cyan

| % Area Fill Cyan Ink | Gloss (GU) Cyan Ink | % Area Fill Cyan/Colorless | Gloss (GU) Cyan + Colorless |
| --- | --- | --- | --- |
| 100 | 59 | 100/0 | 59 |
| 80 | 60 | 80/0 | 61 |
| 60 | 64 | 60/0 | 64 |
| 40 | 68 | 40/55 | 68 |
| 20 | 79 | 20/70 | 76 |
| media | 87 | 0/80 | 78 |
| Avg. | 69 | — | 68 |
| Std. Dev. | 11 | — | 8 |

7b. Magenta

| % Area Fill Magenta Ink | Gloss (GU) Magenta Ink | % Area Fill Magenta/Colorless | Gloss (GU) Magenta + Colorless |
| --- | --- | --- | --- |
| 100 | 62 | 100/0 | 62 |
| 80 | 69 | 80/0 | 68 |
| 60 | 73 | 60/10 | 67 |
| 40 | 77 | 40/50 | 70 |
| 20 | 83 | 20/70 | 75 |
| media | 88 | 0/80 | 79 |
| Avg. | 75 | — | 70 |
| Std. Dev. | 9 | — | 6 |

7c. Yellow

| % Area Fill Yellow Ink | Gloss (GU) Yellow Ink | % Area Fill Yellow/Colorless | Gloss (GU) Yellow + Colorless |
|---|---|---|---|
| 100 | 58 | 100/0 | 57 |
| 80 | 69 | 80/0 | 68 |
| 60 | 73 | 60/0 | 65 |
| 40 | 77 | 40/50 | 66 |
| 20 | 83 | 20/70 | 74 |
| media | 88 | 0/75 | 77 |
| Avg. | 75 | — | 68 |
| Std. Dev. | 11 | — | 7 |

Example 8

Improved Gloss Uniformity of Pigment Ink on HP C3836A Polymer Media

8a. Cyan

| % Area Fill Cyan Ink | Gloss (GU) Cyan Ink | % Area Fill Cyan/Colorless | Gloss (GU) Cyan + Colorless |
|---|---|---|---|
| 100 | 64 | 100/0 | 63 |
| 80 | 68 | 80/0 | 70 |
| 60 | 68 | 60/0 | 69 |
| 40 | 75 | 40/55 | 74 |
| 20 | 85 | 20/75 | 76 |
| media | 87 | 0/97 | 77 |
| Avg. | 75 | — | 72 |
| Std. Dev. | 9 | — | 5 |

8b. Magenta

| % Area Fill Magenta Ink | Gloss (GU) Magenta Ink | % Area Fill Magenta/Colorless | Gloss (GU) Magenta + Colorless |
|---|---|---|---|
| 100 | 78 | 100/0 | 76 |
| 80 | 76 | 80/0 | 78 |
| 60 | 77 | 60/40 | 77 |
| 40 | 79 | 40/60 | 79 |
| 20 | 84 | 20/70 | 79 |
| media | 87 | 0/80 | 79 |
| Avg. | 80 | — | 78 |
| Std. Dev. | 4 | — | 1 |

8c. Yellow

| % Area Fill Yellow Ink | Gloss (GU) Yellow Ink | % Area Fill Yellow/Colorless | Gloss (GU) Yellow + Colorless |
|---|---|---|---|
| 100 | 68 | 100/0 | 68 |
| 80 | 71 | 80/0 | 74 |
| 60 | 75 | 60/35 | 74 |
| 40 | 78 | 40/60 | 81 |
| 20 | 83 | 20/75 | 78 |
| media | 87 | 0/95 | 80 |
| Avg. | 77 | — | 76 |
| Std. Dev. | 7 | — | 5 |

Example 9

Improved Gloss Uniformity of Experimental Polymer-Containing Dye Ink on HP C6831A Polymer Media

9a. Cyan

| % Area Fill Cyan Ink | Gloss (GU) Cyan Ink | % Area Fill Cyan/Colorless | Gloss (GU) Cyan + Colorless |
|---|---|---|---|
| 100 | 74 | 100/0 | 75 |
| 80 | 63 | 80/0 | 63 |
| 60 | 63 | 60/0 | 61 |
| 40 | 65 | 40/60 | 62 |
| 20 | 77 | 20/75 | 72 |
| media | 89 | 0/97 | 80 |
| Avg. | 72 | — | 69 |
| Std. Dev. | 10 | — | 8 |

9b. Magenta

| % Area Fill Magenta Ink | Gloss (GU) Magenta Ink | % Area Fill Magenta/Colorless | Gloss (GU) Magenta + Colorless |
|---|---|---|---|
| 100 | 64 | 100/0 | 65 |
| 80 | 66 | 80/0 | 66 |
| 60 | 68 | 60/0 | 63 |
| 40 | 73 | 40/60 | 66 |
| 20 | 81 | 20/70 | 72 |
| media | 89 | 0/70 | 76 |
| Avg. | 74 | — | 68 |
| Std. Dev. | 10 | — | 5 |

Example 10

Improved Gloss Uniformity of Experimental Polymer-Containing Dye Ink on HP C3836A Polymer Media

10a. Cyan

| % Area Fill Cyan Ink | Gloss (GU) Cyan Ink | % Area Fill Cyan/Colorless | Gloss (GU) Cyan + Colorless |
|---|---|---|---|
| 100 | 79 | 100/0 | 79 |
| 80 | 75 | 80/0 | 76 |
| 60 | 74 | 60/10 | 76 |
| 40 | 72 | 40/60 | 75 |
| 20 | 77 | 20/70 | 78 |
| media | 89 | 0/97 | 81 |
| Avg. | 78 | — | 77 |
| Std. Dev. | 6 | — | 2 |

10b. Magenta

| % Area Fill Magenta Ink | Gloss (GU) Magenta Ink | % Area Fill Magenta/Colorless | Gloss (GU) Magenta + Colorless |
|---|---|---|---|
| 100 | 67 | 100/0 | 67 |
| 80 | 68 | 80/0 | 68 |
| 60 | 69 | 60/0 | 69 |
| 40 | 73 | 40/60 | 72 |
| 20 | 79 | 20/80 | 76 |
| media | 87 | 0/80 | 79 |
| Avg. | 74 | — | 72 |
| Std. Dev. | 8 | — | 5 |

What is claimed is:

1. A method for ink jet printing with improved gloss uniformity, comprising the step of jet printing an image onto a recording medium with an ink set comprising colored inks and at least one colorless ink, wherein the at least one colorless ink is printed substantially only in locations on the image where there is no colored ink so as to substantially equalize gloss across the full tonal range of the image.

2. The method of claim 1, wherein the colorless ink comprises a polymer.

3. The method of claim 2, wherein the colorless ink comprises the polymer in the amount of about 0.1 to about 30.0 percent by weight of the total weight of the colorless ink.

4. The method of claim 2, wherein the polymer is selected from the group poly(meth)acrylates and polyurethanes, and mixtures thereof.

5. The method of claim 1, wherein at least one of the colored inks comprises a polymer, and the colorless ink also comprises the polymer.

6. The method of claim 5, wherein the colorless ink comprises the polymer in the amount of about 0.1 to about 30.0 percent by weight of the total weight of the colorless ink.

7. The method of claim 1, wherein the recording medium is paper based.

8. The method of claim 1, wherein droplets of colorless ink are applied between droplets of colored ink.

9. A method for ink jet printing on low gloss media to provide a high gloss image with substantially uniform gloss across the full tonal range, comprising the step of jet printing an image onto a recording medium with an ink set comprising colored inks and at least one colorless ink, wherein:

a) the inks of the ink set add gloss such that the gloss of the printed area is higher than that of the unprinted media and b) the at least one colorless ink is printed substantially only in locations on the image where there is no colored ink.

10. The method of claim 9, wherein the at least one colorless ink is printed so as to substantially equalize gloss across the full tonal range of the image.

11. The method of claim 10, wherein the colorless ink comprises a polymer.

12. The method of claim 11, wherein the colorless ink comprises the polymer in the amount of about 0.1 to about 30.0 percent by weight of the total weight of the colorless ink.

13. The method of claim 11, wherein the polymer is selected from the group poly(meth)acrylates and polyurethanes, and mixtures thereof.

14. The method of claim 10, wherein at least one of the colored inks comprises a polymer, and the colorless ink also comprises the polymer.

15. The method of claim 14, wherein the colorless ink comprises the polymer in the amount of about 0.1 to about 30.0 percent by weight of the total weight of the color less ink.

16. The method of claim 10, wherein the recording medium is paper based.

17. The method of claim 16, wherein the recording medium is a microporous medium.

18. The method of claim 10, wherein droplets of colorless ink are applied between droplets of colored ink.

* * * * *